US009123081B2

(12) United States Patent
Young et al.

(10) Patent No.: US 9,123,081 B2
(45) Date of Patent: Sep. 1, 2015

(54) PORTABLE DEVICE FOR SIMULTANEOUSLY PROVIDING TEXT OR IMAGE DATA TO A PLURALITY OF DIFFERENT SOCIAL MEDIA SITES BASED ON A TOPIC ASSOCIATED WITH A DOWNLOADED MEDIA FILE

(76) Inventors: Neil Young, Santa Monica, CA (US); Ole Lutjens, San Francisco, CA (US)

( * ) Notice: Subject to any disclaimer, the term of this patent is extended or adjusted under 35 U.S.C. 154(b) by 0 days.

(21) Appl. No.: 13/396,240

(22) Filed: Feb. 14, 2012

(65) Prior Publication Data

US 2012/0303706 A1 Nov. 29, 2012

Related U.S. Application Data

(60) Provisional application No. 61/442,644, filed on Feb. 14, 2011.

(51) Int. Cl.
*G06F 15/16* (2006.01)
*G06Q 50/00* (2012.01)

(52) U.S. Cl.
CPC .................................... *G06Q 50/01* (2013.01)

(58) Field of Classification Search
CPC ....... G06Q 50/01; G06Q 10/10; G06Q 30/02; H04L 51/04; H04L 51/32; H04L 51/046; H04L 12/581; H04L 12/1813
USPC ........... 709/204–206, 223; 715/752, 753, 758
See application file for complete search history.

(56) References Cited

U.S. PATENT DOCUMENTS

| | | | | |
|---|---|---|---|---|
| 8,539,360 | B2 * | 9/2013 | Angell et al. | 715/751 |
| 2003/0212746 | A1 * | 11/2003 | Fitzpatrick et al. | 709/206 |
| 2008/0288582 | A1 * | 11/2008 | Pousti et al. | 709/203 |
| 2010/0036912 | A1 * | 2/2010 | Rao | 709/204 |
| 2010/0095326 | A1 * | 4/2010 | Robertson, III | 725/40 |
| 2010/0114788 | A1 * | 5/2010 | White et al. | 705/319 |
| 2010/0241699 | A1 * | 9/2010 | Muthukumarasamy et al. | 709/203 |
| 2010/0262918 | A1 * | 10/2010 | Angell et al. | 715/738 |
| 2011/0041082 | A1 * | 2/2011 | Nguyen | 715/752 |
| 2011/0161424 | A1 * | 6/2011 | Beringer et al. | 709/205 |
| 2011/0167114 | A1 * | 7/2011 | Blanchard et al. | 709/204 |
| 2012/0036181 | A1 * | 2/2012 | Isidore | 709/203 |
| 2012/0042263 | A1 * | 2/2012 | Rapaport et al. | 715/753 |
| 2012/0174157 | A1 * | 7/2012 | Stinson, et al. | 725/40 |
| 2012/0197986 | A1 * | 8/2012 | Chen et al. | 709/204 |
| 2012/0198355 | A1 * | 8/2012 | Lau et al. | 715/752 |
| 2012/0202587 | A1 * | 8/2012 | Allen et al. | 463/25 |

* cited by examiner

*Primary Examiner* — Oanh Duong
(74) *Attorney, Agent, or Firm* — Perkins Coie LLP

(57) ABSTRACT

A social media interaction application tool and related methods include a communication component, a dialog component, at least one social media link component, a tile display component, and an interaction component, wherein the social media interaction tool is stored on and executed from a portable media storage device, a hand held device, tablet computer, laptop computer, desk top computer or a combination thereof. In some contemplated embodiments, social media interaction application tools are embedded on or included in a media file or collection of media files that are stored or located on a portable media storage device, a hand held device, a tablet computer, a laptop computer, a desk top computer, a network server, an internet server, the cloud or a combination thereof.

6 Claims, 2 Drawing Sheets

PORTABLE DEVICE FOR SIMULTANEOUSLY PROVIDING TEXT OR IMAGE DATA TO A PLURALITY OF DIFFERENT SOCIAL MEDIA SITES BASED ON A TOPIC ASSOCIATED WITH A DOWNLOADED MEDIA FILE

This United States Utility Application claims priority to U.S. Provisional Application Ser. No. 61/442,644 filed on Feb. 14, 2011, which is commonly-owned and incorporated herein in its entirety by reference.

FIELD OF THE SUBJECT MATTER

The field of the subject matter is social media communication networks, applications, design and methods of use.

BACKGROUND

Applications or "apps" have been developed over the last 12-24 months that are designed to work on smart phones, iPads or other tablet computers and other related or similar devices. These apps run the gambit from being purely entertaining, such as games, to being completely useful for the user, such as the new IRS app designed to provide information about the user's tax returns and tax refund. Apps are designed, ultimately, to provide the user with untethered access to any number of sites, games and social media applications on the go and without logging on to a conventional computer or laptop computer.

Another development over the last 12-24 months is the rise of social media. From Facebook.com to Twitter.com, social media has exploded in both scope and use and these sites consistently have hundreds of millions of users on a daily basis. Social media sites allow people to connect to friends, colleagues, businesses, along with providing information about what they are buying, watching, listening to, eating and drinking. These sites are a major step forward for multi-layered communications and monitoring consumer preferences.

Some social media applications only require the user to enter the stream of conversation—such as Twitter.com. Once the user sets up a user ID and password, the user can post, follow others, "retweet" and reply to all of the posts. Unlike Facebook.com, there is no additional layer of privacy where you are only allowed to "tweet" to your friends and contacts and read "tweets" from your friends and contacts. Twitter.com is one example of an open network of groups of users who use hash tags ("#") to identify subject areas and subject matter to group conversations for users. For example, Twitter.com users who want to follow the conversations going on about the uprising in Egypt just needs to go to #Egypt to see the collection of tweets, since the hash tag was formed. In these instances, however, you are depending on the users who came before you to use the hash tag convention in their tweets.

There are other social media websites and there will be new ones developed that are much like Twitter.com, in that they don't limit the user to a predetermined group of friends and contacts, but instead allow the conversations to occur organically between groups of people who want to share ideas and discuss topics that are common to that group of people.

To that end, it would be ideal to develop a new application or "app" that connects users who are discussing similar topics without the need for conventions that are used at a particular site, such as hash tags and Twitter.com. In addition, it would be ideal if this application was able to connect users with one another across various social media sites, so that the user doesn't have to jump from site to site. This type of application will be beneficial, in that it will introduce users to new websites and social media outlets, which could be beneficial for these sites and their advertisers.

SUMMARY OF THE SUBJECT MATTER

Figure 1:
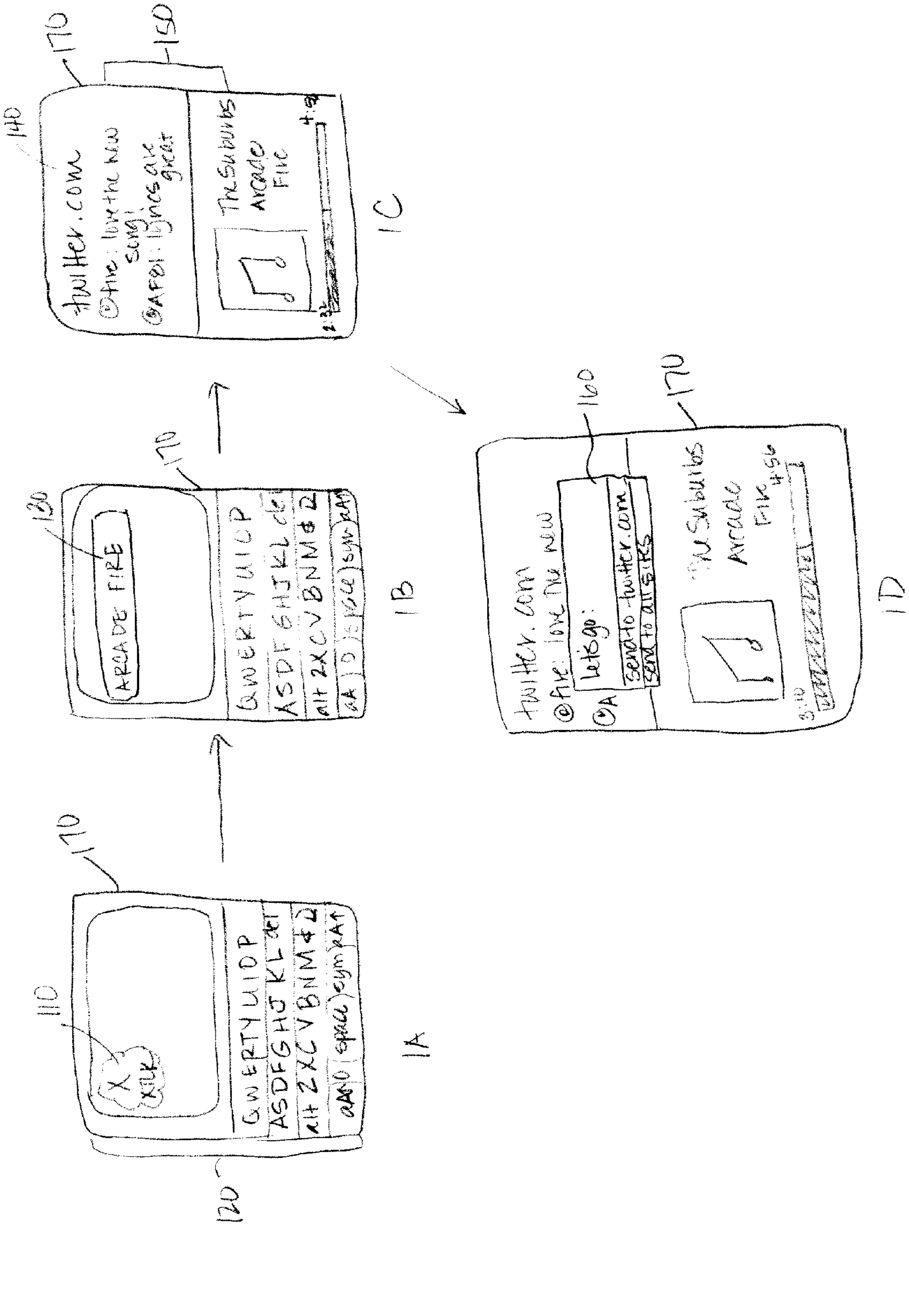
FIG. 1 shows a contemplated embodiment of the social media interaction application tool.

A social media interaction application tool includes a communication component, a dialog component, at least one social media link component, a tile display component, and an interaction component, wherein the social media interaction tool is stored on and executed from a portable media storage device, a hand held device, tablet computer, laptop computer, desk top computer or a combination thereof.

In some contemplated embodiments, social media interaction application tools are embedded on or included in a media file or collection of media files that are stored or located on a portable media storage device, a hand held device, a tablet computer, a laptop computer, a desk top computer, a network server, an internet server, the cloud or a combination thereof.

A method of utilizing a social media interaction application tool includes providing and utilizing a communication component to establish a communication connection, providing and utilizing a dialog component to provide information or content to the application tool, accessing at least one social media link component, wherein the social media link component accesses and interacts with at least one social media website, initiating a tile display component, wherein the tile display component displays the at least one social media website on the user device, and utilizing an interaction component to interact with the at least one social media website, wherein the social media interaction tool is stored on and executed from a portable media storage device, a hand held device, tablet computer, laptop computer, desk top computer or a combination thereof.

DETAILED DESCRIPTION

In order to address the goals described earlier, a new application has been developed that does at least one of the following: a) allows users to connect with one another over social media to discuss a specific topic, b) allows these users to connect over all available social media outlets where friends and contacts are not limited or exclusive, c) allows users to connect and discuss a particular topic without using the individual naming conventions that are used at each social media website; d) allow users to connect using their smart phones, iPad or tablet devices and any other suitable device that may be developed; e) can be embedded or included with a media file or collection of media files that allows the application to operate in conjunction with the media file or collection of media files; and f) allows users to connect not only by using text, but also by using photos, audio and/or video to connect with one another.

A social media interaction application tool 110, as shown in FIGS. 1A-1D, includes a communication component 120, a dialog component 130, at least one social media link component 140, a tile display component 150, and an interaction component 160, wherein the social media interaction tool is stored on and executed from a portable media storage device, a hand held device, tablet computer, laptop computer, desk top computer or a combination thereof 170. In some contemplated embodiments, social media interaction application tools are embedded on or included in a media file or collection of media files that are stored or located on a portable media storage device, a hand held device, a tablet computer, a laptop computer, a desk top computer, a network server, an internet server, the cloud or a combination thereof.

It should be understood that social media websites, digital pages and the like can run the gambit from what is currently being used, such as Twitter.com, to social media sites and applications that will be developed that may be more targeted, such as social media sites and applications developed for iPhone users, Android users, college students, senior citizens, attorneys, doctors, music fans, movie fans, the entertainment industry, etc. As long as these sites, pages and systems are open to a group of people and are based on a feed, stream or transfer of information, they are contemplated herein. Contemplated application tools comprise social media link components as part of the tool, wherein the social media link component identifies at least one social media application that comprises a specific topic, as will be discussed herein.

Contemplated social media interaction application tools include, as mentioned, a communication component. Contemplated communication components may be at least one, at least two or more communication components and are designed to provide a link for the user to communicate with the internet community. Contemplated communication components may include a smart phone, hand held device, laptop computer or another suitable device with a Wi-Fi connection, a desk top computer with a broadband or DSL hard wire connection or another suitable device/link combination that allows the user to communicate with the internet community. In some embodiments, a contemplated communication component comprises at least one connection to the internet, an intranet or another interactive communication portal.

Contemplated social media interaction application tools also comprise at least one dialog component. As understood herein, the at least one dialog component is part of the application tool that is designed to engage the user with the application itself using the at least one communication component and comprises a keyboard, a digital keyboard, an audio or sound recognition component, a video recognition component or combination thereof that collects information from the user and in some embodiments, transmits it via the at least one communication component to the at least one social media link component. The at least one dialog component is operatively connected to the at least one communication component and the at least one social media link component.

Contemplated social media link components are those components that are part of the social media interaction tool that collect the information from the at least one dialog component and the at least one communication component and then perform two functions: a) link to at least one social media website, and b) use the collected information to search for related content on the at least one social media website. Contemplated social media link components may also comprise a storage method or system for securely categorizing, labeling and storing usernames and passwords for various social media websites and systems. Contemplated social medial link components may also suggest new social medial links, websites, systems or combinations thereof to the user, as those sites and systems are developed. As the at least one social media website or social media system loads and displays conversations, information and interactions related to the collected information and related content, the at least one tile display component is engaged.

The at least one tile display component is a component of contemplated social media interaction tools and is designed to present two or more social media websites to the user at the same time on the device. So, if two social media websites, digital pages or combinations thereof are presented to the user, the at least one tile display component will display the websites on the device by using a split screen, such as might be provided by a split-screen function, wherein the split-screen function divides the digital view on the device screen into at least two tiles, with one website on the top and the other on the bottom or both websites side-by-side with respect to the other website. If three social media websites are displayed on the device, then the tile display component may divide the screen into four windows where the fourth window displays information about the song, movie, document or photo or may display an internet search function, such as google or Bing, where the user may search the web for more content. Once the tile display component sets up the screen for the user, the at least one interaction component that is part of the social media interaction application tool is engaged.

The at least one interaction component is designed to allow the user to engage and interact with each of the at least one social media links that are presented by the application tool. As an example, the user may touch one of the tiles that represents and/or is the link to a social media website, such as Twitter, and a keyboard, dialog box or audio recognition tool will open for that website that allows the user to type or provide information to Twitter—as opposed to the other social media websites that are open in the tile display. The at least one interaction component also provides a function wherein the user can post that information to all or more than one of the open social media websites at the same time.

Figure 2:
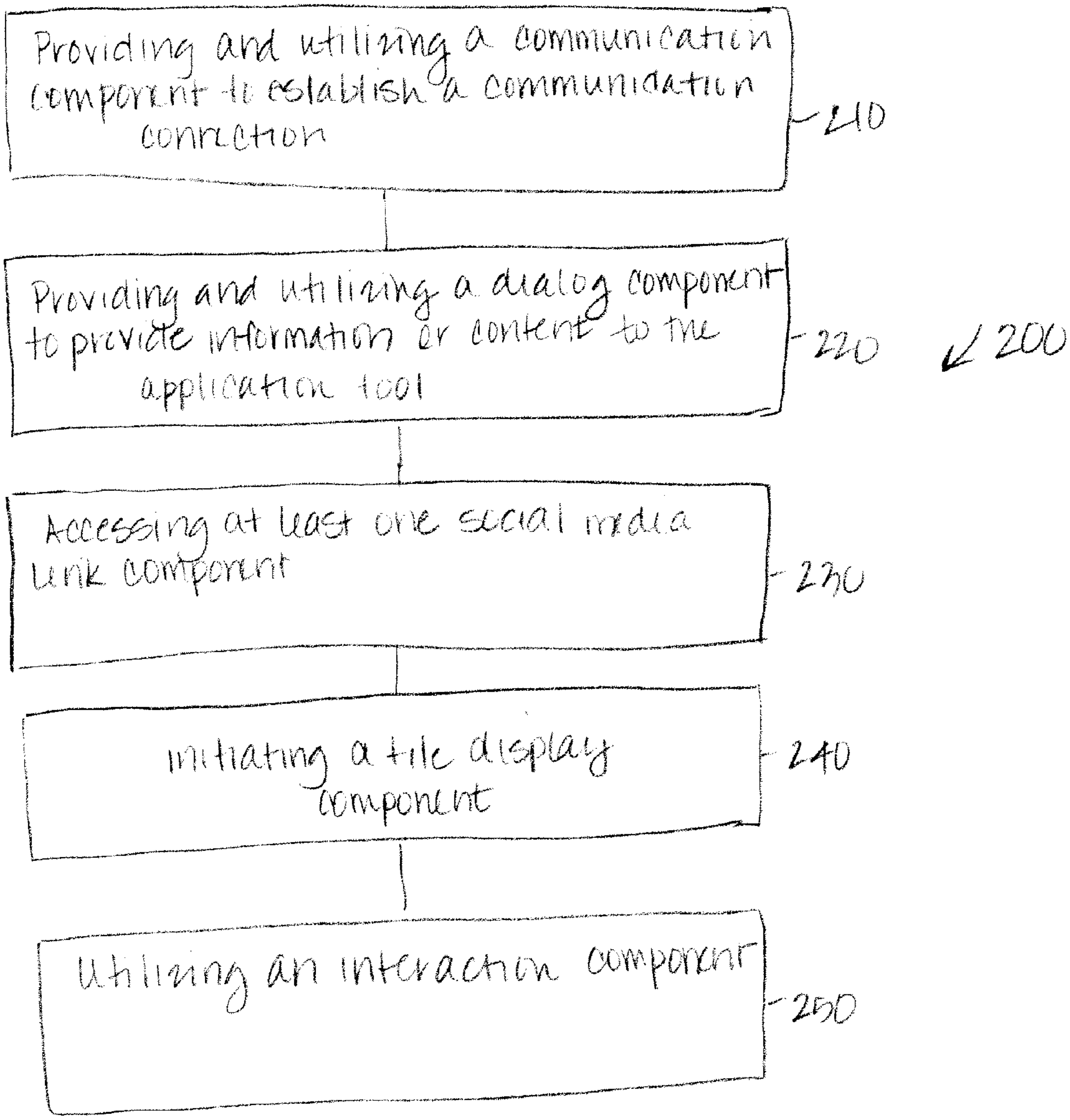
FIG. 2 shows a contemplated embodiment of a method of using a social media interaction tool.

As shown in FIG. 2, a method 200 of utilizing a social media interaction application tool includes providing and utilizing 210 a communication component to establish a communication connection, providing and utilizing 220 a dialog component to provide information or content to the application tool, accessing 230 at least one social media link component, wherein the social media link component accesses and interacts with at least one social media website, initiating 240 a tile display component, wherein the tile display component displays the at least one social media website on the user device, and utilizing 250 an interaction component to interact with the at least one social media website, wherein the social media interaction tool is stored on and executed from a portable media storage device, a hand held device, tablet computer, laptop computer, desk top computer or a combination thereof.

In practical terms, a user can download the application—which for the purposes of this application is referred to herein as the XTLK App or Cross-Talk Application from a computer hard drive, laptop computer, hand held device, network server, internet network server, or the cloud onto her smart phone, iPad or other tablet device. Once downloaded, an icon for the XTLK App would show up on the screen. At this point, this application is available for use. In some embodiments, the user will purchase a DVD, CD or another external storage medium or purchase a media file or group of media files online and the XTLK App would be stored on or embedded in the files or media. As mentioned, in these contemplated embodiments, social media interaction application tools are embedded on, stored on/in, or included in a media file or collection of media files that are subsequently saved on, executed on, stored on or located on a portable media storage device, a hand held device, a tablet computer, a laptop computer, a desk top computer, a network server, an internet server, the cloud or a combination thereof.

In one contemplated embodiment, the user is listening to music or watching a TV show or movie on her iPhone or Blackberry Torch. For the purposes of this example, let's say that the user is watching the film "Inception" on her iPhone. She touches the screen and the icon for the XTLK app appears in the corner of the screen. If she touches the icon and engages the application, the movie will stop playing and she will be directed to a screen showing a stream of other users who are discussing "Inception". At this point, she can join the conversation by selecting her social media interface, such as Twitter.com. In this embodiment, the user enters an on-the-fly "chat room" that contains social media posts across the spectrum of suitable social media sites. Once she is done, she can exit the app and go back to watching the movie. In another embodiment, if she touches the icon or the movie is embedded with the application, the movie can keep playing but tile into one portion of the screen. The social media sites will appear around, above and/or below the movie as it plays. So, it is not imperative or even desirable that the movie stop while the user observes or interacts in the on-the-fly chat room.

In another embodiment, the user is listening to "Heart of Gold" by Neil Young on his iPad tablet device. The user taps the screen and the XTLK app icon appears in the top corner of the screen. The user could also go back to the Home screen, while continuing to listen to the song. Either way, the user engages the XTLK application and can be directed into one of several on-the-fly social media chat rooms. Whether it is one discussing Neil Young, discussing the song "Heart of Gold" or discussing the album "Harvest", the user can discuss the topic that is most appealing to him at the time based on his interest in the song, artist or album. One advantage of contemplated social media interaction application tools is that the listener or viewer can listen to or watch the particular song, movie or video while interacting with the various social media outlets.

In yet another contemplated embodiment, a user is traveling as a passenger in a car and listening to the radio. The song "Ready to Start" comes on the radio and the user decides that she wants to discuss Arcade Fire. She turns on her smart phone, engages the XTLK application and pulls up a communication component, which comprises a digital keyboard, a voice recognition portal or a combination thereof, and a dialog component, such as a text entry box, voice recognition software or a combination thereof. She types in or speaks the phrase "ARCADE FIRE" and is immediately taken into an on-the-fly dynamic chat room that contains an on-going discussion regarding the band pulled from all available social media sites. She can join the conversation by using her Twitter.com account to post to the dynamic thread, respond to others, retweet other comments or just read interesting posts from others. She can also hear the lyrics—such as "businessmen want to drink my blood" and then use the XTLK app to search for other lyrics that contain a portion or all of that line and then see if anyone is chatting about it or posting pictures or video related to those lyrics or a portion of those lyrics. She can also determine if anyone is quoting these lyrics now in any of the available social media sites.

The flip side of the XTLK app is that the application recognizes key words, search terms and other information stored in the files or media and the application can work on its own to open up the on-the-fly interactive chat room or dialog space for the user based on what the user is listening to or watching. In some embodiments, when a song has ended, the application will recognize this, search for information provided by the next song that is playing and set up an interactive on-the-fly chat room or dialog space for that song, artist or lyrics.

There are a number of benefits included with this type of contemplated application, including that it is not limited to the social media outlets available at the time. As new social media outlets are developed and/or current social media outlets design new features, the contemplated application will be able to pull in on-going conversations across all of those social media outlets.

In some embodiments, the on-going conversation will be shown in chronological order. This design would be ideal for a smart phone where the screen is small. So, as new posts are made and pulled into the dynamic chat room by the application, it is listed with the newest or oldest post first—depending on how the user wants to see it. In another embodiment, the on-going conversation will be shown in grid format with each social media outlet having its own separate field. This design would be good to use on an iPad or tablet device. In this embodiment, the application would comprise a tile component that operates to divide the screen into quadrants, such as two or four quadrants, for example, with Twitter.com in one quadrant and the other social media sites in the other three quadrants. The user could choose the grid format or the chronological format. There may also be other formats available, including sorting by relevance, sorting by country or location, sorting by celebrities, critics or journalists versus other individuals, or any other suitable sorting format.

In another contemplated embodiment, the user of the application will be able to peruse the various social media sites that are pulled back by the application and see how many posts have been made about that topic in each site over a period of time. The user can decide to go to the site that has the most posts on that topic or the most posts on that topic in the last 10 minutes. Is it an active chat room or one that has a lot of archived information? The user will be able to determine what to look at, read, review and/or decline to look at, read and view.

This contemplated application can also be used with a platform, such as the one described in United States Patent Publication No. US-2009-0313251-A1 entitled "A Sortable and Updatable Archiving Platform and Uses Thereof". These platforms are extensive platforms for intelligently labeling, sorting, archiving and updating information, while at the same time allowing all of that information to be searchable and contained within one format and providing an entirely new entertainment and information experience for consumers. These compilation and archiving platforms and systems also allow the original information and any new pieces of information to be intelligently, logically and automatically sorted by and on the platform without any significant work on the part of the user/listener.

If a user has this type of platform loaded on his or her smart phone or table device, as the user reviews the items stored in a particular compilation, the XTLK icon will appear at the bottom of the screen allowing the user to go into the application and discuss the compilation or items in the compilation with the members of the dynamic chat room.

Thus, specific embodiments and applications of social media communication networks and methods of use have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

We claim:

1. A portable device comprising:

a memory;

a CPU; and at least one communication component stored in the memory and configured to receive a media file or collection of media files from a network, wherein the media file or the collection of media files embeds a social media interaction application tool, wherein the social media interaction application tool operates in conjunction with the media file or collection of media files, and wherein the social media interaction application tool is stored on the memory, and executed by the CPU, wherein the portable device includes a display and comprises a hand held device, tablet computer, and/or laptop computer;

wherein social media interaction application tool comprises:

the a dialog component operatively connected to the at least one communication component;

at least first and second social media link components, wherein the first social media link component provides a user with access to a first social media site, wherein the second social media link component provides the user with access to a second, different social media site, and wherein: the first and second social media link components identify at least one social media application that comprises a specific topic selected from multiple, different topics related to the media file or the collection of media files; and direct the user to a screen showing a stream of other users, in the first and second social media sites, discussing the specific topic;

a tile display component, wherein the tile display component is configured to:

display the first social media site in a first tile on the display of the portable device, and concurrently display in a second tile of the display of the portable device either the second social media site, or information related to the media file or the collection of media files, and an interaction component, wherein the interaction component is configured to permit the user to:

select one of the first or second tiles displayed by the tile display component, automatically open a user input portion to permit the user to provide text or image data to the at least one social media application, enter the text or image data into the user input portion, and simultaneously provide the text or image data across the first and second social media sites corresponding to the at least first and second social media link components via the user input portion.

2. The portable device of claim 1, wherein the communication component is configured to receive a media file or collection of media files from a network server, internet server, the cloud or a combination thereof.

3. The portable device of claim 1, wherein the dialog component accesses a keyboard, a digital keyboard, an audio recognition component, a video recognition component or a combination thereof, to receive user input.

4. The portable device of claim 1, wherein the application tool stores username information, password information, or a combination thereof, for the user and for each of the first and second social media sites, to permit the application tool to automatically access each of the first and second social media sites.

5. The portable device of claim 1, wherein the social media link component comprises at least one social media application that comprises a topical dynamic thread, wherein the user can view the topical thread via the mobile device and provide input to the topical thread via the mobile device, and wherein the application tool recognizes keywords, search terms and other information stored in the media file or the collection of media files, and open up an interactive chat room or dialogue space for the user based on what the user is listening or watching on the portable device.

6. The portable device of claim 1, wherein the tile display component comprises a split-screen function, wherein the split-screen function divides the digital view on the device screen into at least three tiles, and wherein the tile display component is configured to concurrently display the second social media site in the second tile, and concurrently display in a third tile information related to the media file or the collection of media files.

* * * * *